(12) United States Patent
Kelleher (10) Patent No.: US 9,574,795 B2
(45) Date of Patent: Feb. 21, 2017

(54) SOLAR SYSTEM MOUNTING ASSEMBLY

(71) Applicant: Stephen Kelleher, Fairhaven, MA (US)

(72) Inventor: Stephen Kelleher, Fairhaven, MA (US)

(*) Notice: Subject to any disclaimer, the term of this patent is extended or adjusted under 35 U.S.C. 154(b) by 0 days.

(21) Appl. No.: 13/676,990

(22) Filed: Nov. 14, 2012

(65) Prior Publication Data

US 2013/0118113 A1  May 16, 2013

Related U.S. Application Data (60) Provisional application No. 61/560,037, filed on Nov. 15, 2011.

(51) Int. Cl.
| | | |
|---|---|---|
| *E04D 13/18* | (2014.01) | |
| *E02D 5/74* | (2006.01) | |
| *F24J 2/52* | (2006.01) | |
| *E04H 12/34* | (2006.01) | |
| *E02D 27/42* | (2006.01) | |
| *E04H 12/22* | (2006.01) | |

(52) U.S. Cl.
CPC ............ *F24J 2/5232* (2013.01); *E02D 27/42* (2013.01); *E04H 12/2215* (2013.01); *E04H 12/347* (2013.01); *F24J 2/525* (2013.01); *Y02E 10/47* (2013.01)

(58) Field of Classification Search
CPC .... E04H 12/2215; E04H 12/347; F24J 2/525; F24J 2/5232; E02D 27/42; Y02E 10/47
USPC .......... 52/173.3, 155–160, 165, 166
See application file for complete search history.

(56) References Cited

U.S. PATENT DOCUMENTS

| | | | | |
|---|---|---|---|---|
| 505,357 A | * | 9/1893 | Hansbarger | 256/58 |
| 556,518 A | * | 3/1896 | Phelps | 256/35 |
| 573,777 A | * | 12/1896 | Johnson | 52/166 |
| 606,558 A | * | 6/1898 | Ketchum | 52/154 |
| 826,908 A | | 7/1906 | Thomas | |
| 852,555 A | * | 5/1907 | Glassco | 52/116 |
| 1,142,046 A | * | 6/1915 | Michod | 52/154 |
| 1,437,057 A | * | 11/1922 | Holland | 256/58 |
| 1,924,834 A | * | 8/1933 | Carrel | 52/154 |
| 1,940,430 A | | 12/1933 | Morterra | 135/15 |
| 2,176,566 A | | 10/1939 | Dillon | 52/160 |
| 2,366,997 A | | 1/1945 | Brand | 189/92 |
| 2,863,535 A | | 12/1958 | Clapper | 52/161 |

(Continued)

FOREIGN PATENT DOCUMENTS

| | | | |
|---|---|---|---|
| GB | 11138 | 0/1911 | |
| WO | WO2011014655 | 2/2011 | F16M 11/10 |

OTHER PUBLICATIONS

International Search Report and the Written Opinion issued for corresponding application No. PCT/US2012/065072, dated Jan. 25, 2013 (10 pgs).

(Continued)

*Primary Examiner* — Phi A
*Assistant Examiner* — Omar Hijaz
(74) *Attorney, Agent, or Firm* — Hayes Soloway P.C.

(57) ABSTRACT

A ground mounting assembly, system and methods for ground mounting a structure include a plurality of posts, each of which are attached to at least one stabilizing plate. The posts may be at least partially positioned underground, with the connected stabilizing plates being buried to a depth of about 1 foot. Posts in a front portion of the mounting assembly may be connected to an adjacent one of posts in a back portion of the assembly by a cross member.

19 Claims, 7 Drawing Sheets

(56) References Cited

U.S. PATENT DOCUMENTS

| | | | |
|---|---|---|---|
| 2,947,149 A | 8/1960 | Barkley | 405/244 |
| 3,342,444 A * | 9/1967 | Nelson | 52/165 |
| 3,512,319 A | 5/1970 | Piacentino | |
| 3,727,357 A * | 4/1973 | Stillman, Jr. | 52/154 |
| 3,772,838 A | 11/1973 | Virnig | 52/160 |
| 3,797,260 A | 3/1974 | Webb | 405/172 |
| 3,888,057 A * | 6/1975 | Zubke | 52/163 |
| 3,969,853 A | 7/1976 | Deike | 52/156 |
| 3,983,779 A * | 10/1976 | Dimas | F16B 15/06 411/447 |
| 4,086,735 A | 5/1978 | Adams | 52/160 |
| 4,102,143 A | 7/1978 | Phares et al. | 405/227 |
| 4,592,178 A | 6/1986 | Lu | 52/155 |
| 4,893,787 A | 1/1990 | Watson | 256/35 |
| 4,936,703 A * | 6/1990 | Ferns | E02D 29/14 404/25 |
| 5,028,166 A | 7/1991 | Leishman | 404/10 |
| 5,226,829 A | 7/1993 | Jones | 135/118 |
| 5,261,760 A * | 11/1993 | Castonguay | A01G 1/08 404/7 |
| 5,349,775 A * | 9/1994 | Mondares | 43/21.2 |
| RE35,133 E | 12/1995 | Halloran | 405/244 |
| 5,881,495 A * | 3/1999 | Clark | 47/48.5 |
| 5,984,587 A | 11/1999 | Odle | 405/244 |
| 6,141,903 A | 11/2000 | Mancini | 47/42 |
| 6,226,930 B1 | 5/2001 | Kraatz | 52/64 |
| 6,302,099 B1 | 10/2001 | McDermott | 126/600 |
| 6,328,273 B1 | 12/2001 | Kemikem | 248/530 |
| 6,722,357 B2 * | 4/2004 | Shingleton | 126/600 |
| 7,175,141 B2 * | 2/2007 | Bolinder et al. | 248/156 |
| 7,225,760 B2 * | 6/2007 | Krieger | 119/786 |
| 7,686,283 B2 * | 3/2010 | Marchio | 256/73 |
| 8,544,221 B2 | 10/2013 | Marley | 52/173.3 |
| 8,584,413 B1 * | 11/2013 | Keller, Sr. | 52/297 |
| 2004/0115009 A1 * | 6/2004 | Bradley et al. | 405/259.1 |
| 2005/0167644 A1 * | 8/2005 | Deupree | 256/32 |
| 2007/0077133 A1 * | 4/2007 | Wesolowska | 411/508 |
| 2007/0170412 A1 * | 7/2007 | Lee | 256/59 |
| 2008/0276549 A1 * | 11/2008 | Turley | 52/166 |
| 2009/0293379 A1 * | 12/2009 | Smith | 52/154 |
| 2010/0071755 A1 | 3/2010 | Kruse | 136/251 |
| 2010/0127142 A1 | 5/2010 | Genschorek | 248/222.14 |
| 2010/0139649 A1 * | 6/2010 | Almy et al. | 126/704 |
| 2011/0121144 A1 * | 5/2011 | Berbegal Pastor | 248/185.1 |
| 2011/0163051 A1 * | 7/2011 | Horanek | 211/26 |
| 2012/0047825 A1 | 3/2012 | Chang et al. | 52/173.3 |
| 2012/0152316 A1 | 6/2012 | Fischer et al. | 136/246 |

OTHER PUBLICATIONS

Office Action issued in related U.S. Appl. No. 13/839,842, dated Jan. 15, 2014 (25 pgs).

Office Action issued in related U.S. Appl. No. 13/839,842, dated Aug. 25, 2014 (22 pgs).

International Search Report and Written Opinion issued in related application No. PCT/US2014/0286876, dated Nov. 13, 2014 (14 pgs).

Office Action issued in related U.S. Appl. No. 13/839,842, dated Jan. 29, 2015 (32 pgs).

International Preliminary Report on Patentability issued in application No. PCT/US2014/028686, dated Oct. 1, 2015 (11 pgs).

Office Action issued in U.S. Appl. No. 13/839,842, dated Oct. 21, 2015 (28 pgs).

Office Action issued in U.S. Appl. No. 13/839,842, dated Apr. 15, 2014 (15 pgs).

Office Action issued in U.S. Appl. No. 13/839,842, dated Jul. 1, 2015 (24 pgs).

International Preliminary Report on Patentability issued in application No. PCT/US2012/065072, dated May 14, 2015 (9 pgs).

Chinese Office Action (no translation) issued in application No. 201280066667.0, dated Oct. 9, 2015 (12 pgs).

Chinese Second Office Action issued in application No. 201280066667.0, dated Apr. 15, 2016 (10 pgs).

Office Action issued in U.S. Appl. No. 13/839,842, dated Mar. 11, 2016 (25 pgs).

Office Action issued in U.S. Appl. No. 13/839,842, dated May 31, 2016 (18 pgs).

* cited by examiner

SOLAR SYSTEM MOUNTING ASSEMBLY

CROSS REFERENCE TO RELATED APPLICATIONS

This application claims priority from U.S. Provisional Application Ser. No. 61/560,037, filed Nov. 15, 2011.

FIELD

The present disclosure is generally related to ground mounting assemblies, systems and methods for ground mounting structures. The invention has particular utility in connection with ground mounting photovoltaic solar panel assemblies, and will be described in connection with such utility, although other utilities are contemplated.

BACKGROUND

Many outdoor structures, such as solar panel assemblies, billboards, signs and the like, are mounted into the ground using posts or poles. Often, these assemblies are subjected to high winds, which can loosen the mounting posts, thereby making the assembly unstable. For example, solar panel assemblies typically have a large surface area for capturing solar energy; however, such assemblies also may be subjected to wind forces, which may be translated into the mounting posts, thereby loosening the soil surrounding the mounting structure. This problem is particularly amplified where such assemblies are mounted in loose or sandy soil.

In the case of solar panel assemblies, many such assemblies are mounted with posts that do not have sufficient underground surface area to provide adequate resistance to counter the wind forces acting upon the above-ground solar panel assembly. For example, a commonly used post in such assemblies may be about 2.5 inches in width. To address the problem of instability, one known technique involves pouring a cement cap over the entire surface of the mounting structure. However, this is a very costly measure, and further suffers from the disadvantage of making the installation a permanent or semi-permanent fixture. Thus, rearranging, modifying or retrofitting the installation becomes significant undertaking because of the presence of the cap.

SUMMARY

Embodiments of the present disclosure provide a ground mounting assembly for mounting a structure, a photovoltaic system mounted to a ground mounting assembly, methods for stabilizing a preinstalled ground mounting assembly and methods for ground mounting a structure. Briefly described, the present disclosure can be viewed as providing mounting assemblies, systems and methods for ground mounting structures utilizing posts having attached stabilizing plates.

In one aspect, the present disclosure provides a ground mounting assembly for mounting a structure, which includes a plurality of posts, each post being connected to at least one stabilizing element which may take the forth of a flat plat which may be fixed to or togel mounted to the post, or a half-pyramid shaped structure, fixed to the post. A first portion of the plurality of posts may define a front of the mounting assembly, and a second portion of the plurality of posts may define a back of the mounting assembly, and each of the front posts may be connected to an adjacent one of the back posts by a cross member.

In another aspect, the present disclosure provides a photovoltaic system, which includes a ground mounting assembly having a plurality of posts, each post being connected to at least one stabilizing element. At least two of the plurality of posts may be connected by a cross member, and a solar panel array may be mounted to the ground mounting assembly.

In a further aspect, the present disclosure provides a method of stabilizing a preinstalled ground mounting assembly having a plurality of posts buried at least partially in the ground. The method includes the steps of: excavating an area of ground surrounding each of the plurality of posts; attaching at least one stabilizing element to each of the plurality of posts, in an area exposed by the excavating; and backfilling the excavated area. The method may further include: excavating a portion of ground between posts defining a front of the mounting assembly and posts defining a back of the mounting assembly; and attaching a cross member between each of the front posts and an adjacent one of the back posts.

In yet another aspect, the present disclosure provides a method of ground mounting a structure, including the steps of: forming a mounting assembly by driving a plurality of posts into the ground, each of the posts being connected to at least one stabilizing element; and attaching the structure to an above-ground portion of the mounting assembly. The method may further include the steps of: excavating an area of ground between posts defining a front of the mounting assembly and posts defining a back of the mounting assembly; attaching a cross member between each of the front posts and an adjacent one of the back posts; and backfilling the excavated area.

The features, functions, and advantages that have been discussed can be achieved independently in various embodiments of the present disclosure or may be combined in yet other embodiments further details of which can be seen with reference to the following description and drawings.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 8A-8B are side elevational views.

DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Figure 1:
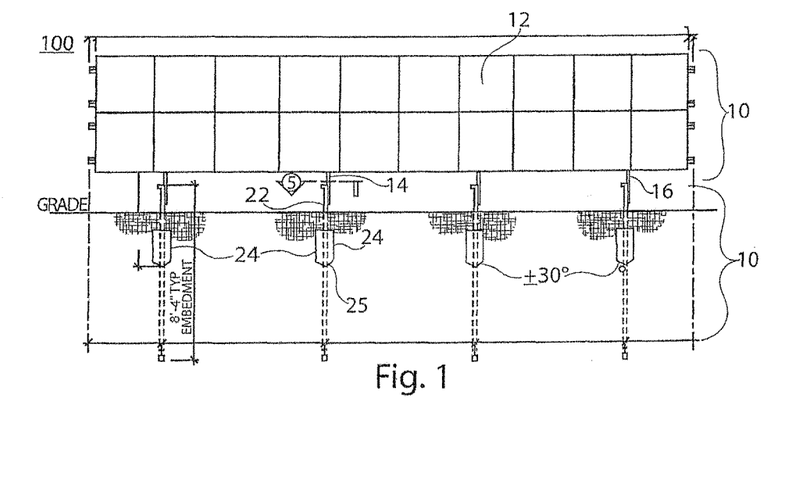
FIG. 1 is an illustration of a front elevation view of a photovoltaic (PV) system, in accordance with an exemplary embodiment of the disclosure.

FIG. 1 is an illustration of a front elevation view of a photovoltaic (PV) system 10, in accordance with a first exemplary embodiment of the disclosure. The system 10 includes a solar panel assembly 10 and a mounting assembly 20. The solar panel assembly 10 may include an array of solar panels 12, which may be physically joined to one another, as well as electrically connected.

The mounting assembly 20 includes a plurality of posts 22. In one embodiment posts 22 may be any pile, pole, stake, or any similar structure which may be positioned at least partially underground, and fixed firmly in an upright position. In one embodiment posts 22 may be sigma posts (as shown in the plan section of FIG. 2).

One or more stability elements 24 are attached to each post 22. The stability elements 24 may take the form of flat plates, and may be made, e.g. of galvanized steel. The elements or plates 24 may be of any dimensions, depending on the desired stability and/or the type of structure to be mounted onto the mounting assembly 20. As shown in FIG. 1, the plates 24 may be approximately 12"×24"×3/16". Preferably, the stability plates 24 include angled lower corners 25. The lower corners 25 may have an angle of about 15° to 45°, preferably about 30° from the horizontal plane, as shown in FIG. 1. The angled corners 25 allow the plates 24, for example when attached to posts 22, to be more readily driven into the ground. The plates 24 are attached to the posts 22 by any known attachment techniques, including welding, epoxies or other adhesives, rivets, screws, nuts and bolts or any other structural fastener, and the like. As shown in the plan section of FIG. 2, taken along line 14, the plates 24 may be attached to the post 22 with a bolt 26.

Depending on the characteristics of the structure to be mounted, the position of attachment of the stability plates 24 to the posts 22, as well as the underground depth of the plates 24, may vary. As shown in FIG. 1, the structure to be mounted may be a solar panel assembly 10. For such a solar panel assembly 10, the stability plates 24 may preferably be attached to the posts 22 and buried to a depth of about 1' from the top of the plates 24, as shown in FIG. 1. For example, posts 22 may be about 10' in height, with an embedment depth of about 8'4" and an above-ground height of about 1'8". The stability plates 24 may be positioned underground such that the flat surface of the plates 24 faces the same direction as the vertical component (h) of the solar panels 12 of the assembly 10, as shown by the arrows in FIG. 4. That is, the buried flat surface of the plates 24 may face the same direction as the wind-bearing vertical component of the above-ground photovoltaic surface, thus providing underground resistance to prevent or minimize movement of the posts as the solar panels 12 are subjected to wind. Also, if desired, two or more of the posts may be connected together by cross members 27, which are buried underground.

Figure 3:
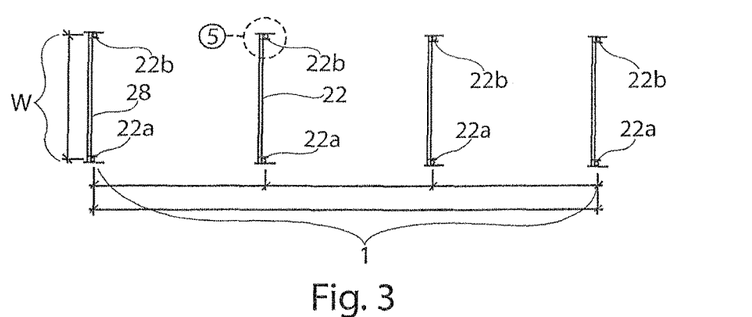
FIG. 3 is an illustration of a plan view of the system shown in FIG. 1, in accordance with an exemplary embodiment of the disclosure.

As shown in the plan view of FIG. 3, the posts 22 of the mounting assembly 20 may be arranged in a rectangular fashion, with a first set of posts 22a defining a front of the assembly 20 and a second set of posts 22b defining a back of the assembly 20. A length (l) of the assembly 20 may be defined by the total distance between front posts 22a or back posts 22b, while the width (w) of the assembly 20 may be defined by the distance between adjacent front 22a and back 22b posts. Other geometric patterns may be produced from the positioning of the posts, depending on the shape and mounting positions of the structure to be mounted, as those having ordinary skill in the relevant field will readily understand.

The posts 22 may be attached to each other with cross members 28, thereby providing further structural strength and stability to the mounting assembly 20 and the system 10. The cross members 28 may be any type of attachment member for providing stability and/or structural strength when attached between two or more posts 22. For example, the cross members 28 may be a rigid structure, such as a pole. The cross members 28 may be 2"×2"×3/16" galvanized tube steel.

Figure 2:
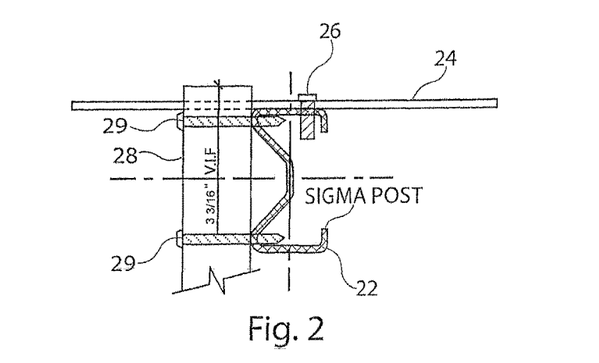
FIG. 2 is an illustration of a plan section at a post, taken along line 14 of FIG. 1, in accordance with an exemplary embodiment of the disclosure.
Figure 4:
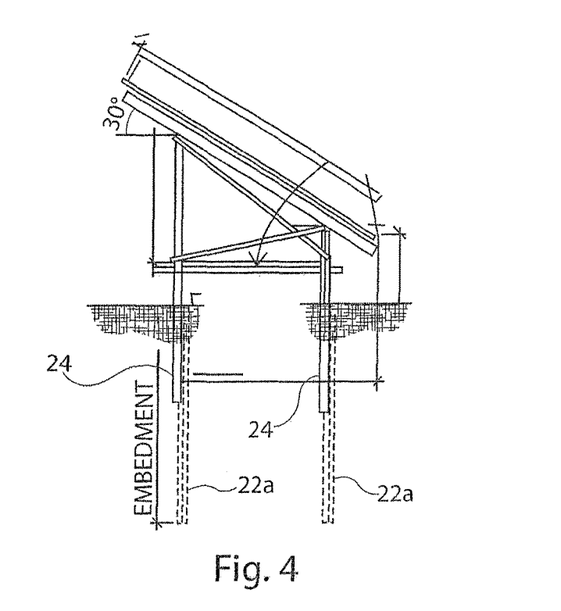
FIG. 4 is an illustration of a side elevation view of the system shown in FIG. 1, in accordance with an exemplary embodiment of the disclosure.

As shown in the side elevation view of FIG. 4, the cross members 28 may be attached to the posts 22 underground (e.g., at a position above, below or near the position of the plates 24) and/or above ground. The cross members 28 may be attached to the posts 22 before or after installing the posts 22 in the ground. For example, slots may be dug into the ground, into which the cross members 28 and posts 22 may be positioned, and then backfilled. The cross members 28 may be attached to the post 22 by any known attachment techniques, including welding, rivets, epoxies or other adhesives, screws, nuts and bolts or any other structural fastener, and the like. As shown in FIG. 2, the cross members 28 may be attached to the post 22 with two self-drilling truss-head screws 29.

The cross members 28 may attach posts 22 in pairs, as shown in FIG. 3. The cross members 28 may attach posts 22 along an axis orthogonal to the flat surface of the plates 24 (e.g., as shown in FIG. 3, the cross members 28 attach front posts 22a to back posts 22b along an axis orthogonal to the surface of the plates 24). By attaching cross members 28 to posts 22 orthogonal to the plane of the surface of the plates 24, stability to the mounting assembly 20 is provided to the system 100 to counter wind against the face of the solar panel assembly 10. A structure to be mounted, such as the solar panel assembly 10, may be of a size such that it may be desirable to form the mounting assembly 20 of two or more pairs of posts 22 (e.g., four pairs of posts 22, as shown in FIG. 3). However, the mounting assembly 20 may include any number of posts 22, and may include cross members 28 which may attach posts 22 in any direction, for example, front posts 22a to adjacent back posts 22b, front 22a to front 22a, back 22b to back 22b, as well as front posts 22a to non-adjacent back posts 22b.

The solar panel assembly 10 may be mounted to the mounting assembly 20, for example, by attaching mounting posts 16 of the solar panel assembly 10 to above-ground portions of the posts 22 of the mounting assembly 20. While the mounting assembly 20 has been described primarily with respect to mounting a solar panel assembly 10, any other assembly may be mounted to the mounting assembly 20 of the present disclosure. For example, the mounting assembly 20 may be used for mounting other types of photovoltaic systems, including PV concentrators and mirror assemblies, as well as billboards, signs or any other structure which may be subjected to winds.

Existing mounting structures may be retrofitted for stability utilizing principles provided by the present disclosure. For example, an existing mounting structure for a photovoltaic system may include posts 22 which have previously been driven into the ground, and to which a solar panel assembly 10 has been attached. To provide increased stability, particularly in loose or sandy soil, plates 24 may be attached to the posts 22. In order to attach the plates 24, an area of ground surrounding the posts 22 may be dug out, for example to a depth of about 3 feet. Plates 24 may then be attached to the posts, for example with bolts 26. For further stability, cross members 28 may be attached between adjacent front 22a and back 22b posts, for example, by digging a trench between posts 22, attaching cross members 28, and backfilling the trenches.

Figure 5:
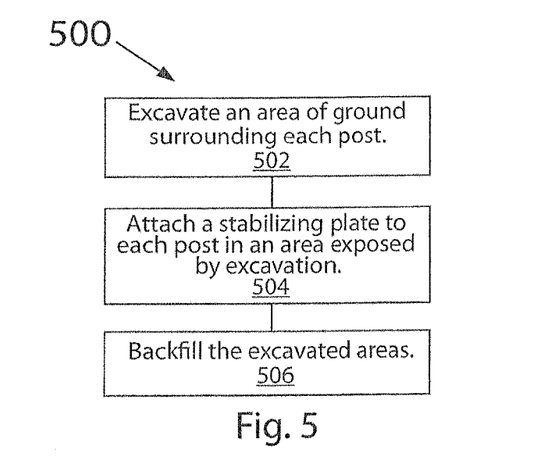
FIG. 5 is a flowchart illustrating a method of stabilizing a preinstalled ground mounting assembly, in accordance with an exemplary embodiment of the disclosure.

FIG. 5 is a flowchart 500 illustrating a method of stabilizing a preinstalled ground mounting assembly having a plurality of posts 22 buried at least partially in the ground, in accordance with an embodiment of the disclosure. As shown by block 502, an area of ground surrounding each of the posts 22 is excavated. At block 504, a stabilizing plate 24 is attached to each of the posts 22, in an area exposed by the excavation. At block 506, the excavated area is backfilled. The stabilizing plates 24 may be attached to the posts 22 at a position such that the top edge of the stabilizing plates 24 is buried to a depth of about 1 foot underground.

The method may further include excavating a portion of ground between posts 22a defining a front of said mounting assembly and posts 22b defining a back of the mounting assembly 20, and attaching a cross member 28 between each of front posts 22a and an adjacent one of the back posts 22b.

Figure 6:
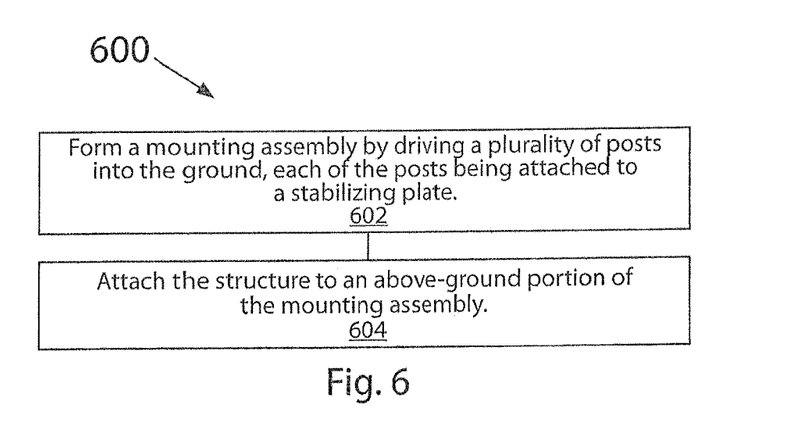
FIG. 6 is a flowchart illustrating a method of ground mounting a structure, in accordance with an exemplary embodiment of the disclosure.

FIG. 6 is a flowchart 600 illustrating a method of ground mounting a structure. As shown by block 602, a mounting assembly 20 is formed by driving a plurality of posts 22 into the ground, each of the posts 22 being connected to a stabilizing plate 24. At block 604, the structure is attached to an above-ground portion of the mounting assembly 20. The posts 22 may be driven into the ground to a position such that the stabilizing plates 24 are buried to a depth of about 1 foot underground. The structure may be a solar panel array 10.

The method may further include excavating an area of ground between posts 22a defining a front of the mounting assembly 20 and posts 22b defining a back of the mounting assembly 20, and attaching a cross member 28 between each of the front posts 22a and an adjacent one of the back posts 22b, and backfilling the excavated area.

Figure 7A:
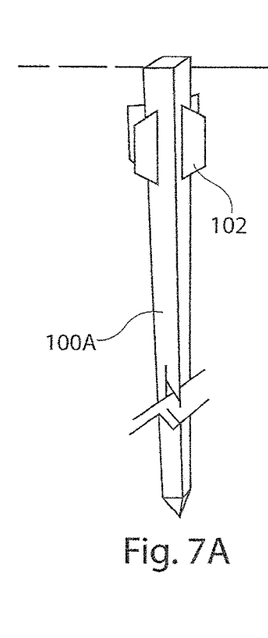
FIGS. 7A-7C are perspective views of alternative embodiments of posts in accordance with the present disclosure.
Figure 7B:
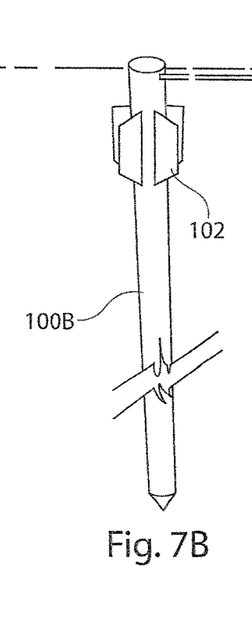
Figure 7C:
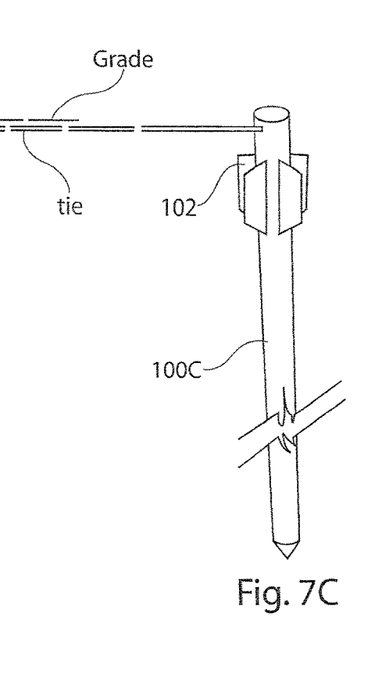
Figure 8A:
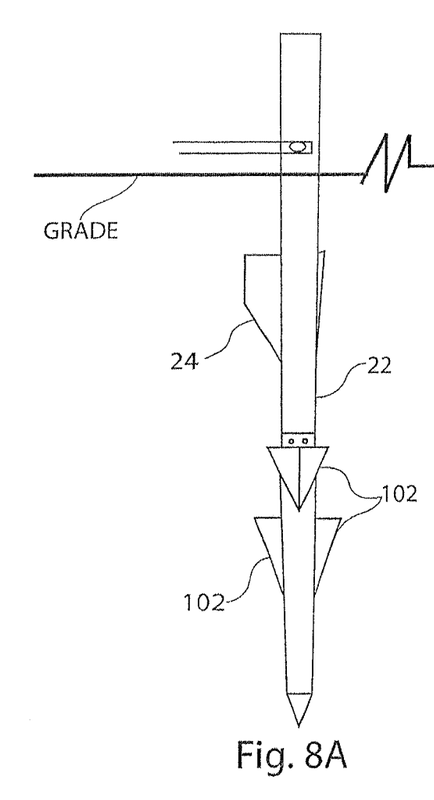
Figure 8B:
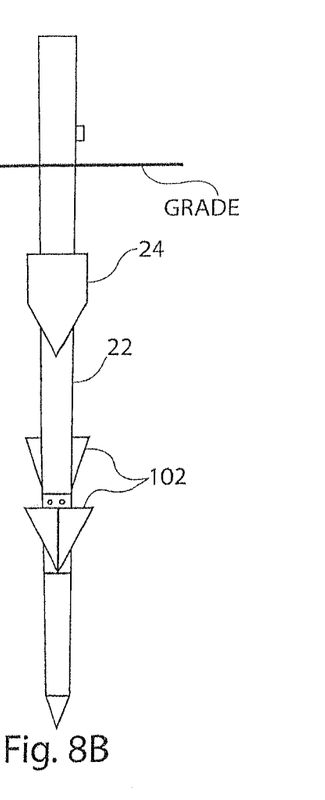
Figure 8C:
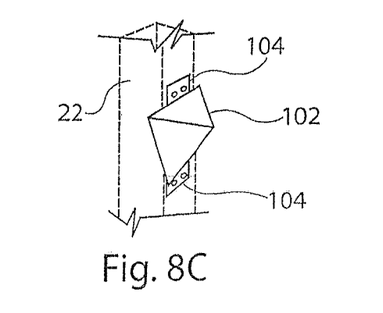
FIG. 8C is a perspective view, respectively, of yet another alternative embodiment of posts in accordance with the present disclosure.
Figures 9A, 9B, 9C, 9D:
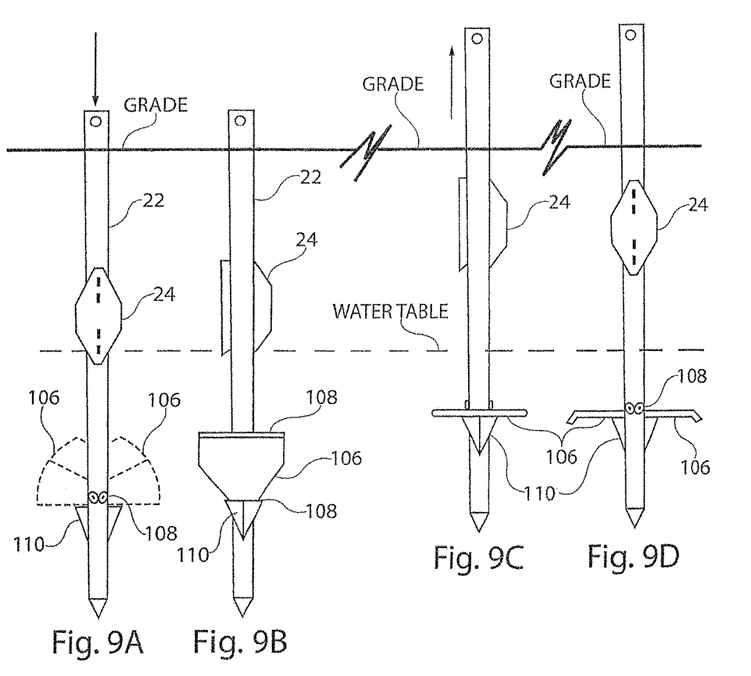
FIGS. 9A-9D are side elevational views of yet another alternative embodiment of posts of the present disclosure.
Figure 10A:
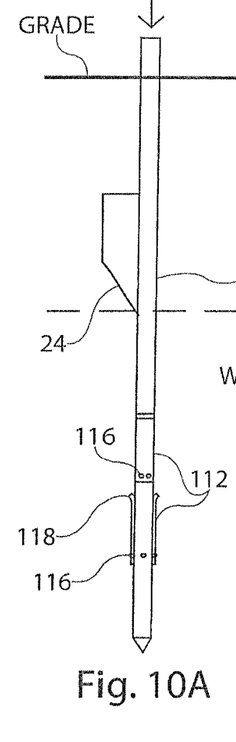
FIGS. 10A-10B are side elevational views of still yet another embodiment of posts of the present disclosure.
Figure 10B:
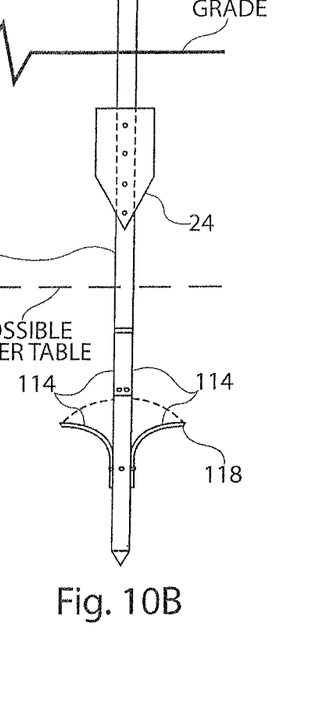

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. For example, as illustrated in FIGS. 7A-7C, the piles or posts 100A, 100B, 100C may have different cross-sections, and may have multiple plates 102 mounted thereon. Alternatively, as shown in FIGS. 8A-8C, one or more additional stabilizing elements in the form of a half pyramid-shaped structure 102 may be fixedly mounted, using, for example, mounting plates 104, to posts 22 for stabilizing the structure against uplift. In such embodiment, the half pyramid-shaped stabilizing elements preferably are fixed to the lower half of posts 22. In still yet another embodiment, shown in FIGS. 9A-9D, the stabilizing elements may take the form of togel mounted anchor plates 106 which are pivotably mounted to posts 22 around a pivot 108. In the case of pivotably mounted stabilizing elements or plates 106, the post typically will be driven in the ground below a target position, e.g. as shown in FIGS. 9A and 9B. The posts would then be pulled vertically into a final position causing the togel mounted plates 106 to fan out against a stop plate 110 which, in a preferred embodiment, comprises a half pyramid-shaped element. Alternatively, as shown in FIGS. 10A and 10B, the stabilizing elements may take the form of bendable plates 112 having reduced resistance bending points 114, fixed to post 22 adjacent their lower ends by fasteners 116. The upper, free ends 118 of plates 112 preferably are curved outwardly. Also, the disclosure advantageously may be used with solar thermal energy systems. All such modifications and variations are intended to be included herein within the scope of the present disclosure and protected by the following claims.

What is claimed is:

1. A ground mounting assembly for mounting a structure, comprising:
   one or a plurality of posts, each post having a width and at least one pivotally mounted or bendable-upwardly curved or angled plate attached thereto, wherein each post also includes at least one three-sided pyramid-shaped stabilizing element having three triangular shaped sides, each side of said pyramid-shaped stabilizing element having a pointed end and a base end positioned opposite the pointed end, said pyramid-shaped stabilizing element being non-pivotally, fixedly mounted to the post spaced from both ends of the post, with the pointed end of each side being directed down and meeting at a common point and the base end of each side being directed up, wherein the bases of the triangular shaped sides of the at least one three-sided pyramid-shaped stabilizing element extend beyond the width of the post, said pyramid-shaped stabilizing element stabilizing the assembly against uplift.

2. The mounting assembly of claim 1, comprising a plurality of posts, wherein said plurality of posts are at least partially buried underground, said plurality of posts being connected together by cross members which are either buried underground or set above ground.

3. The mounting assembly of claim 2, wherein a top edge of each said cross members is buried to a depth of at least 1 foot underground.

4. The mounting assembly of claim 1, wherein said posts comprise sigma posts.

5. The mounting assembly of claim 1, wherein said post includes a plurality of said pivotally mounted or bendable plates.

6. The mounting assembly of claim 1, comprising a plurality of posts, wherein a first portion of said plurality of posts define a front of said mounting assembly, and a second portion of said plurality of posts define a back of said mounting assembly, and wherein each of said posts are connected to an adjacent post by a cross member.

7. The mounting assembly of claim 6, wherein the mounting assembly is in the form of a geometric shape in plan.

8. The mounting assembly of claim 1, wherein the posts have round, square or geometric cross-sections.

9. A solar energy system, comprising:
a ground mounting assembly having a plurality of posts, each post having a width and at least one pivotally mounted or bendable upwardly curved or angled plate attached thereto, wherein each post also includes at least one three-sided pyramid-shaped stabilizing structure having three triangular shaped sides, each side of said pyramid-shaped stabilizing structures having a pointed end and a base end positioned opposite the pointed end, each pyramid-shaped stabilizing structure being non-pivotally fixedly mounted to a respective post spaced from both ends of the post, with the pointed end of each side being directed downward and meeting at a common point and the non-pointed ends of each side being directed up, wherein the bases of the triangular shaped sides of each of the three-sided pyramid-shaped stabilizing structures extend beyond the width of the post, said pyramid-shaped stabilizing structures stabilizing the assembly against uplift, wherein at least two of said plurality of posts are connected by a cross member; and
a solar panel array mounted to said ground mounting assembly.

10. The solar energy system of claim 9, wherein said plurality of posts are at least partially positioned underground, with the cross members being buried and a mounting portion of said plurality of posts being exposed above ground.

11. The solar energy system of claim 10, wherein a top edge of said cross members is buried to a depth of about 1 foot underground.

12. The solar energy system of claim 9, wherein said posts comprise sigma posts.

13. The solar energy system of claim 9, wherein a first portion of said plurality of posts define a front of said mounting assembly, and a second portion of said plurality of posts define a back of said mounting assembly.

14. The solar energy system of claim 13, wherein the mounting assembly forms a rectangular shape.

15. The solar energy system of claim 9, wherein the solar panel comprises a photovoltaic collector panel.

16. The solar energy system of claim 9, wherein the solar panel comprises a solar thermal collector panel.

17. The solar energy system of claim 9, wherein the posts have round, square or oval cross-sections.

18. The mounting assembly of claim 1, wherein the at least one half-pyramid-shaped stabilizing element is non-pivotally fixedly mounted to a lower half of the post.

19. The solar energy system of claim 9, wherein the half-pyramid-shaped stabilizing structures are non-pivotally fixedly mounted to a lower half of the posts.

* * * * *